(No Model.)
C. C. BATES & C. D. WREN.
HAND FERTILIZER DISTRIBUTER.
No. 448,004. Patented Mar. 10, 1891.
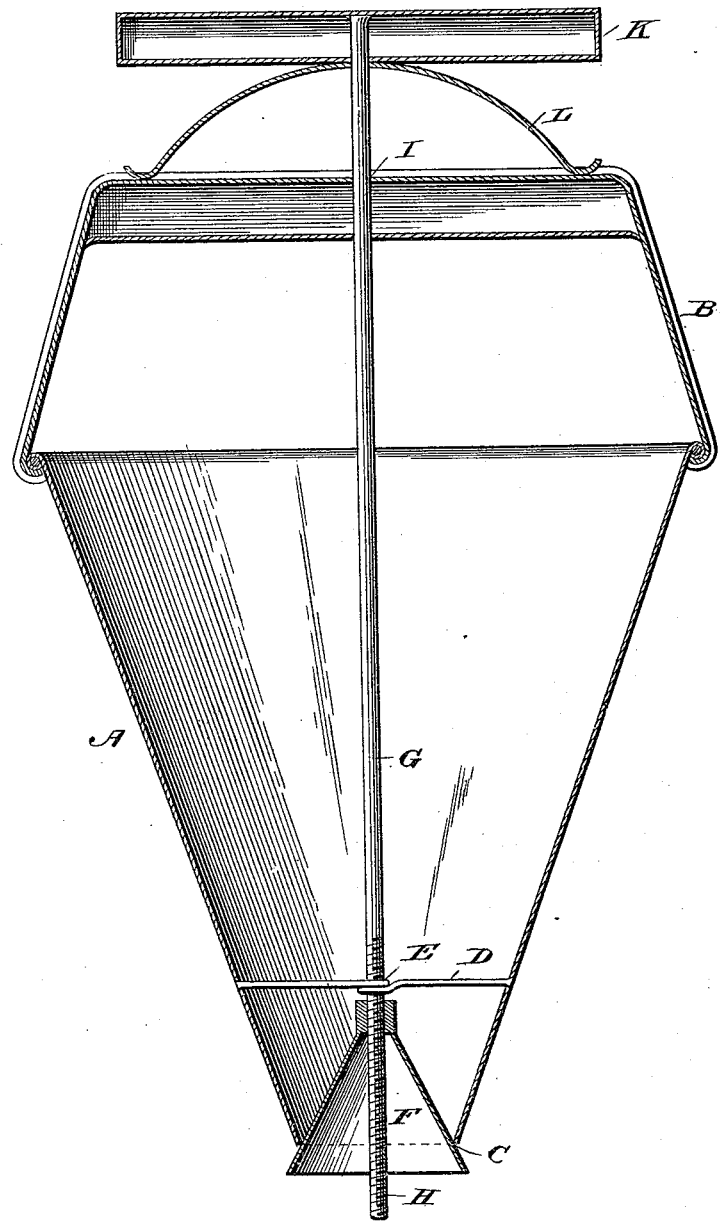
Witnesses:
Inventors:
Charles C. Bates and
Charles D. Wren
By, Freeman and Money
Attorneys.

UNITED STATES PATENT OFFICE.

CHARLES C. BATES AND CHARLES D. WREN, OF CENTREVILLE, MISSISSIPPI.

HAND FERTILIZER-DISTRIBUTER.

SPECIFICATION forming part of Letters Patent No. 448,004, dated March 10, 1891.

Application filed December 3, 1890. Serial No. 373,438. (No model.)

*To all whom it may concern:*

Be it known that we, CHARLES C. BATES and CHARLES D. WREN, of Centreville, county of Wilkinson, and State of Mississippi, have invented a new and useful Improvement in Hand Fertilizer-Distributers; and we do hereby declare that the following is a full, clear, and exact description of the invention, which will enable others skilled in the art to which it appertains to make and use it, reference being had to the accompanying drawing, forming a part thereof.

Our invention relates to an improvement in hand fertilizer-distributers; and it consists in the peculiar construction and combination of devices that will be more fully set forth hereinafter, and particularly pointed out in the claims.

The accompanying drawing is a vertical sectional view of our improved hand fertilizer-distributer.

A represents a conical hopper of suitable dimensions adapted to contain fertilizer, and B represents a curved or bowed handle, which is arranged across the upper side of the hopper and has its ends attached to opposite edges thereof. At the lower end of the hopper is a discharge-opening C of suitable size, and above said opening is a guide-rod D, having an opening E in its center.

F represents the discharge-cup, which is conical in form and is arranged in the opening C. A rod G has its lower portion H threaded and engaging a threaded opening in the upper end of the discharge-cup, and the said rod passes through the guide-opening E and through a central opening I in the handle and has its upper end secured to a cross-bar K. A semi-elliptical spring L has its central portion bearing under the center of the cross-bar and its ends bearing on the handle, and said spring has an opening in its center, through which the rod G passes. The spring serves to raise the rod and the cup and to keep the latter normally in position to close the discharge-opening in the hopper.

In using the invention the operator grasps the handle and cross-bar with one hand and by compressing the spring lowers the cup and partly uncovers the discharge-opening of the hopper, thus allowing a portion of the fertilizer to escape. The conical form of the cup serves effectually to distribute the fertilizer in the hill, as will be readily understood. The cup may be adjusted on the threaded end of the rod by turning it, thus regulating the tension of the spring and also regulating the quantity of fertilizer discharged at each operation.

A fertilizer-distributer thus constructed is extremely cheap and simple, is extremely practical, and will be found of great utility for putting fertilizer in hills of corn or other crops.

Having thus described our invention, we claim—

1. The fertilizer-distributer comprising the conical hopper having the handle at its upper end and the discharge-opening in its lower end, the conical cup arranged in the opening and adapted to close it, the rod attached to the cup and guided in the handle, the cross-bar at the upper end of the rod, and the spring arranged between the handle and the cross-bar, substantially as described.

2. The fertilizer-distributer comprising the conical hopper having the handle at its upper end and the discharge-opening in its lower end, the conical cup arranged in the opening and adapted to close it, the rod screwed in the upper end of the cup, whereby the latter is rendered adjustable, the guide for the rod, the cross-bar at the upper end of the latter, and the spring-bearing between the handle and the cross-bar, substantially as described.

In testimony that we claim the foregoing we append our signatures.

CHARLES C. BATES.
    CHARLES D. WREN.

Witnesses:
 S. G. STERN,
 WM. A. DICKSON.